Dec. 11, 1951 W. KENNEDY 2,577,772
RADIANT GAS BURNER, INCLUDING AIR FILTER AND VENTURI MIXER
Filed Oct. 3, 1947 2 SHEETS—SHEET 1
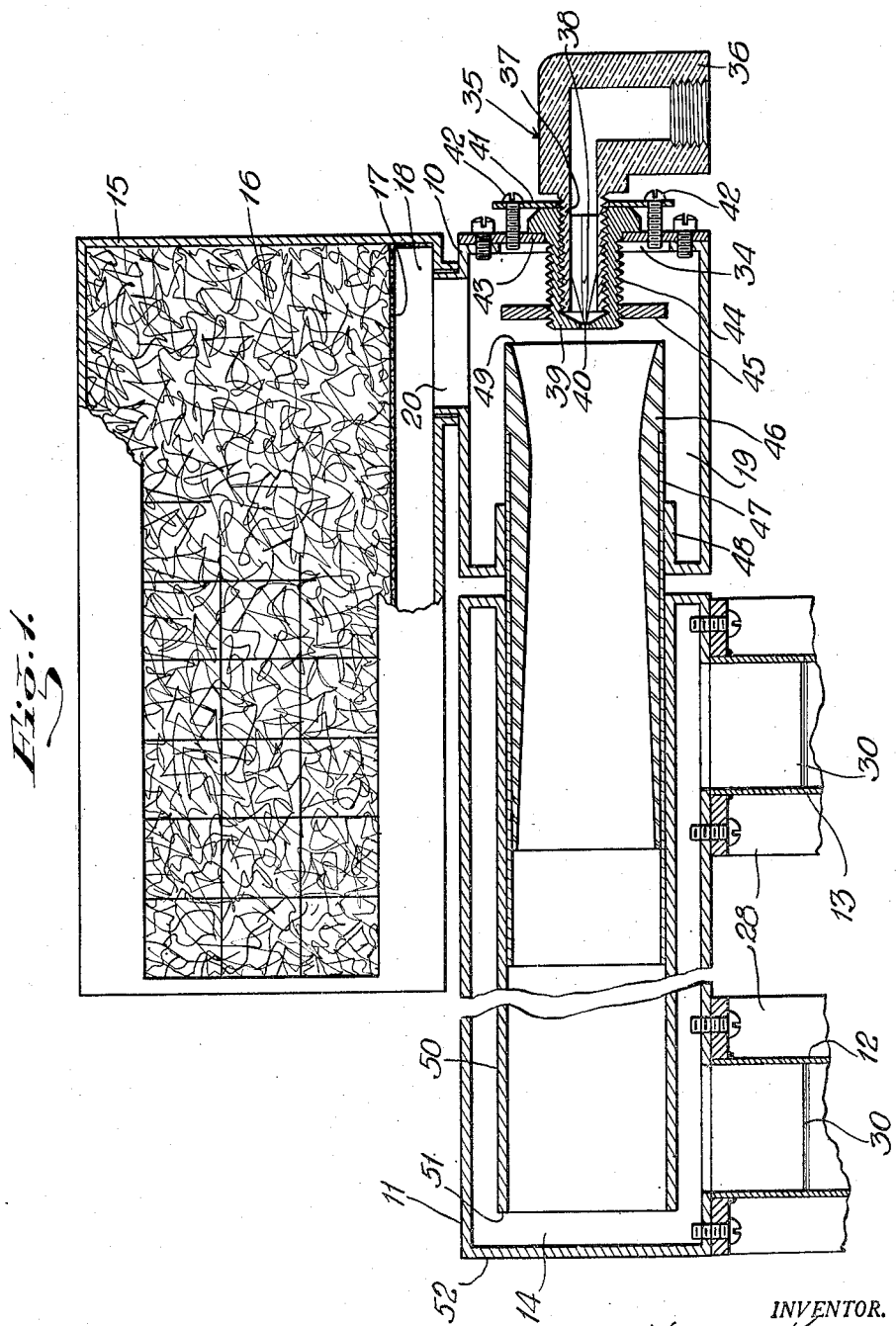
INVENTOR.
WALTER KENNEDY
BY

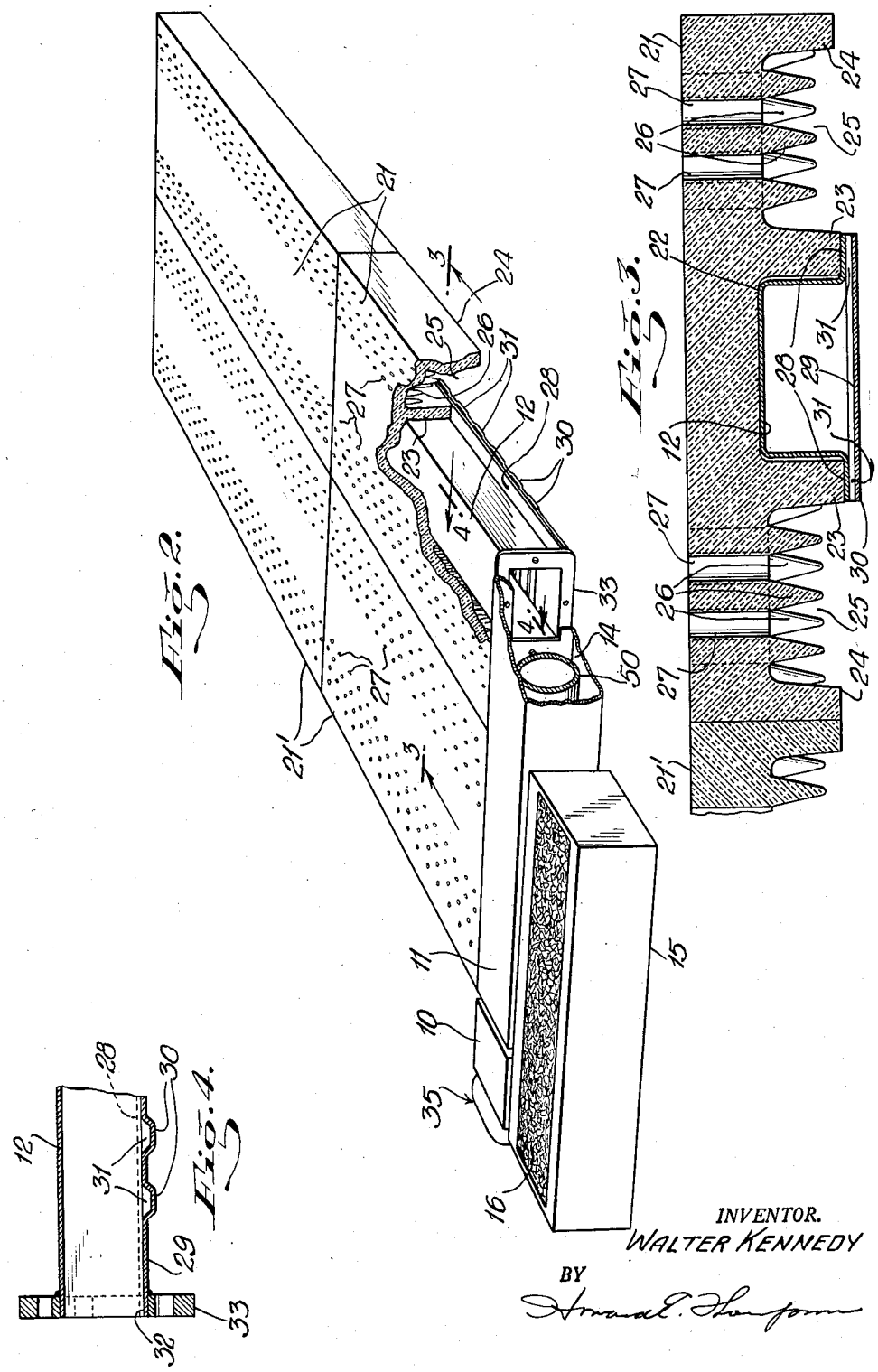

Patented Dec. 11, 1951

2,577,772

UNITED STATES PATENT OFFICE 2,577,772

RADIANT GAS BURNER, INCLUDING AIR FILTER AND VENTURI MIXER

Walter Kennedy, Cliffside Park, N. J.

Application October 3, 1947, Serial No. 777,721

4 Claims. (Cl. 158—113)

This invention relates to gas appliances, particularly of the type and kind utilizing radiant heat for apparatus of any type or kind. More particularly, the invention deals with means for controlling and regulating supply of a combustible mixture to the burner tubes of the appliance and to the combustion chambers. Still more particularly, the invention deals with an appliance of the character defined wherein the burner tube structure is adjustable with respect to the gas and air control mechanism of the appliance without disturbing the latter, to adapt the appliance for mounting in apparatus of different kinds and classes.

The novel features of the invention will be best understood from the following description when taken together with the accompanying drawing, in which the separate parts are designated by suitable reference characters in each of the views, and in which:

Fig. 1 is a sectional view through part of an appliance made according to my invention, on an enlarged scale, and with part of the construction broken away and with parts shown in elevation.

Fig. 2 is a perspective view of the structure, showing the more complete appliance, with parts of the construction broken away and in section.

Fig. 3 is a partial section on the line 3—3 of Fig. 2, on an enlarged scale; and Fig. 4 is a partial section on the line 4—4 of Fig. 2, on an enlarged scale.

The gas appliance forming the subject matter of my invention may be said to comprise a unit having a mixing chamber or casing 10, a burner tube supporting casing 11, having two burner tubes 12 and 13 extending therefrom and communicating with the chamber 14 thereof by the openings provided, as clearly seen in Fig. 1.

Supported upon, and communicating with the mixing chamber or casing 10 is a filter casing 15 in which is supported suitable filtering material 16, the casing 15 having a mesh or other openwork raised bottom 17, so that filtered air may pass into a chamber 18 of the casing 15 and from the chamber 18 into the chamber 19 of the casing 10 through a large port 20. Arranged upon and extending longitudinally of each of the tubes 12 and 13 are radiant blocks, preferably arranged in pairs, one pair being designated by the reference character 21, as applied to the burner tube 12, and another pair as at 21', which are applied to the tube 13, the latter being not visible in Fig. 2 of the drawing. Each block 21—21' is of the same construction so that the brief description of one will apply to all.

One block 21 is shown in cross section in Fig. 2, together with part of an adjacent block 21'. Each block has centrally and longitudinally thereof a channel 22 for the reception of the burner tube, the channel forming side walls 23 extending onto the sides of the tube, as is clearly seen in Fig. 3. Spaced from the walls 23 are other downwardly extending side walls 24 forming combustion chambers 25 at opposite sides of and longitudinally of each of the blocks. Extending downwardly into the chambers 25 are a plurality of conical radiant elements 26 between which the wall of the block has perforations 27 which open into the chamber 25 and outwardly through the top of the blocks to allow products of combustion to rise to the upper surface of the blocks.

Each burner tube 12—13 is also of the same construction, and therefore, the brief description of one will apply to the other.

The tube 12 for illustration purposes has been shown in perspective in Fig. 2, in cross section in Fig. 3 and in partial longitudinal section in Fig. 4. These tubes comprise a channel shaped casing having laterally extending flanges, as at 28, adapted to seat upon the lower surfaces of the walls 23, as clearly seen in Fig. 3. Secured to the flanges by welding or otherwise, at longitudinally spaced intervals is a closure nozzle plate 29 having longitudinally spaced corrugations, as at 30, note Figs. 2 and 4, the corrugations forming at opposite sides of the tube fuel discharge passages or burner nozzles 31. These nozzles are substantially of regular form, except for the slight bevelling of the walls, as seen in Fig. 4 of the drawing and the area of the nozzles is controlled by the width of the corrugations, as well as the depth of the corrugations, or in other words, spacing of the corrugations with respect to the flanges 28. The fuel discharge nozzles extend for the greater part of the length of each tube and are directed into the chambers 25 of both pairs of blocks 21—21', as will be apparent. The free ends of the tubes 12 and 13 will be closed and the other open ends 32 thereof include mounting flanges 33 for attachment of the tubes to the casing 11.

The casing 10 has a large opening 34 in the wall thereof in which is supported the gas injecting nozzle generally identified by the reference character 35, note Fig. 1. The nozzle 35 comprises an elbow 36 coupled with the gas feed pipe and having an externally threaded extension 37 in which is fitted, by pressed fit or otherwise, a conventional needle valve 38. Adjustably supported on the threaded extension 37 is a thimble-shaped nozzle 39 having a discharge opening 40 in conjunction with which the needle 38 operates in controlling discharge of gas, as will be apparent. The nozzle 39 is retained in position by a retaining plate 41 arranged upon the extension 37 having screws 42 passing into another plate 43 secured to the casing 10 around the opening 34. The nozzle 39 is externally threaded, as seen at 44, and an air control disc 45 is adjustably supported thereon to control admission of air into a Venturi tube 46, as will be apparent. The Venturi tube 46 is mounted upon a tube 47 which is welded or otherwise secured to a hub portion 48 in the casing 10. The Venturi tube will have a pressed fit in the tube 47, thus the position of the Venturi tube is fixed in the casing and the nozzle 39 and air control disc 45 are adjustable toward and from the open end 49 of the Venturi tube. This structure is all clearly shown in Fig. 1 of the drawing.

The casing 11 has an elongated inner tube portion 50 which is adjustable along the tube 47 in adjustment of the casing 11 toward and from the casing 10. The free end 51 of the tube 50 terminates short of the end wall 52 of the casing 11 so that the gaseous mixture discharged through the open end 51 of the tube 50 can freely pass into the chamber 14 of the casing 11 to pass out through the burner tubes 12 and 13.

From the foregoing construction it will appear that the needle valve 38 is adjustable with respect to the discharge 40 of the nozzle in control of the discharge of gas into the venturi. The air control disc 45 is adjustable on the nozzle to control admission of air into the venturi and controlling and regulating the gaseous mixture for supply to the burner tubes. It will be understood that all the air supplied to the chamber 19 is filtered through the filter casing 15, thereby maintaining a high efficiency in operation.

It will be apparent that by utilizing the filter of the type and kind indicated, a large surface area is exposed to atmosphere for filterization of air, which in turn passes through the screen 17 into the large and free chamber 18 for insuring free passage of air through the admission port 20. By utilizing filtering means of this type and kind, substantially no choking effect is experienced on the air supply to the burner, at least for operation over a long period of time and at long intervals the filtering material may be cleansed or replenished in conventional manners.

With the construction employed and shown clearly in Fig. 1, it will be apparent that the entire nozzle unit 35 may be detached by simply removing the plate 43 and pulling the unit out through the opening 34. This opening is also sufficiently large to facilitate cleaning of the Venturi tube as and when the same may be desired.

Having fully described my invention, what I claim as new and desire to secure by Letters Patent is:

1. A gas appliance of the character described, comprising two casings having end walls, said casing being arranged end to end in spaced relation, adjacent end walls of said casings having integral tubular portions centrally thereof and extending into the casings, said tubular portions forming large alined common diameter openings in said end walls, the tubular portion of one casing extending throughout the major portion of the length of said casing and forming with the inside of said casing a distributing chamber in said casing around said tubular portion, the inner end of said tubular portion opening into said chamber, said casing having a pair of openings spaced longitudinally of one side wall thereof and communicating with said distributing chamber, the other casing having an air admission port at one side thereof spaced with respect to the tubular portion thereof, a tube fitting snugly in and supported by the tubular portions of said casings and joining said spaced casings to form a continuous gas and air passage from the second named casing into the distributing chamber of the first named casing, said tube being fixed to the tubular portion of the first named casing, the second named casing having a gas supply pipe, a gas discharge nozzle supported on said pipe and extending into the second named casing, a venturi in said tube and having an end arranged adjacent said nozzle to receive fuel therefrom, an air admission casing communicating with said air admission port, and means adjustable longitudinally of the nozzle controlling admission of air into said venturi.

2. A gas appliance of the character described, comprising two casings having end walls, said casing being arranged end to end in spaced relation, adjacent end walls of said casings having integral tubular portions centrally thereof and extending into the casings, said tubular portions forming large alined common diameter openings in said end walls, the tubular portion of one casing extending throughout the major portion of the length of said casing and forming with the inside of said casing a distributing chamber in said casing around said tubular portion, the inner end of said tubular portion opening into said chamber, said casing having a pair of openings spaced longitudinally of one side wall thereof and communicating with said distributing chamber, the other casing having an air admission port at one side thereof spaced with respect to the tubular portion thereof, a tube fitting snugly in and supported by the tubular portions of said casings and joining said spaced casings to form a continuous gas and air passage from the second named casing into the distributing chamber of the first named casing, said tube being fixed to the tubular portion of the first named casing, the second named casing having a gas supply pipe, a gas discharge nozzle supported on said pipe and extending into the second named casing, a venturi in said tube and having an end arranged adjacent said nozzle to receive fuel therefrom, an air admission casing communicating with said air admission port, means adjustable longitudinally of the nozzle controlling admission of air into said venturi, a pair of burner units mounted on the first named casing and communicating with the openings thereof, each unit having an elongated burner tube, and each of said burner tubes having laterally directed fuel discharge nozzles at opposite sides thereof and spaced longitudinally thereof.

3. A gas appliance of the character described, comprising two casings having end walls, said casing being arranged end to end in spaced relation, adjacent end walls of said casings having integral tubular portions centrally thereof and extending into the casings, said tubular portions forming large alined common diameter openings in said end walls, the tubular portion of one casing extending throughout the major portion of the length of said casing and forming with the inside of said casing a distributing chamber in said casing around said tubular portion, the inner end of said tubular portion opening into said chamber, said casing having a pair of openings spaced longitudinally of one side wall thereof and communicating with said distributing chamber, the other casing having an air admission port at one side thereof spaced with respect to the tubular portion thereof, a tube fitting snugly in and supported by the tubular portions of said casings and joining said spaced casings to form a continuous gas and air passage from the second named casing into the distributing chamber of the first named casing, said tube being fixed to the tubular portion of the first named casing, the second named casing having a gas supply pipe, a gas discharge nozzle supported an said pipe and extending into the second named casing, a venturi in said tube and having an end arranged adjacent said nozzle to receive fuel therefrom, an air admission casing communicating with said air admission port, means adjustable longitudinally of the nozzle controlling admission of air into said venturi, a pair of burner units mounted on the first named casing and communicating with the openings thereof, each unit having an elongated burner tube, each of said burner tubes having laterally directed fuel discharge nozzles at opposite sides thereof and spaced longitudinally thereof, each burner unit including a radiant arranged along the burner tube, and the radiant of each tube having combustion chambers at opposite sides of and extending longitudinally of the burner tube.

4. A gas appliance of the character described, comprising two casings having end walls, said casing being arranged end to end in spaced relation, adjacent end walls of said casings having integral tubular portions centrally thereof and extending into the casings, said tubular portions forming large alined common diameter openings in said end walls, the tubular portion of one casing extending throughout the major portion of the length of said casing and forming with the inside of said casing a distributing chamber in said casing around said tubular portion, the inner end of said tubular portion opening into said chamber, said casing having a pair of openings spaced longitudinally of one side wall thereof and communicating with said distributing chamber, the other casing having an air admission port at one side thereof spaced with respect to the tubular portion thereof, a tube fitting snugly in and supported by the tubular portions of said casings and joining said spaced casings to form a continuous gas and air passage from the second named casing into the distributing chamber of the first named casing, said tube being fixed to the tubular portion of the first named casing, the second named casing having a gas supply pipe, a gas discharge nozzle supported on said pipe and extending into the second named casing, a venturi in said tube and having an end arranged adjacent said nozzle to receive fuel therefrom, an air admission casing communicating with said air admission port, means adjustable longitudinally of the nozzle controlling admission of air into said venturi, the last named casing including an air filter, a pair of radiant burner units communicating with the openings of the first named casing, and each unit having a pair of combustion chambers extending longitudinally thereof.

WALTER KENNEDY.

REFERENCES CITED

The following references are of record in the file of this patent:

UNITED STATES PATENTS

| Number | Name | Date |
| --- | --- | --- |
| 781,020 | Partridge | Jan. 31, 1905 |
| 1,330,048 | Baker | Feb. 10, 1920 |
| 1,676,472 | Axtel et al. | July 10, 1928 |
| 1,732,071 | Shaw | Oct. 15, 1929 |
| 2,011,283 | Huff | Aug. 13, 1935 |
| 2,182,734 | O'Dowd | Dec. 5, 1939 |
| 2,378,839 | Ensign | June 19, 1945 |

FOREIGN PATENTS

| Number | Country | Date |
| --- | --- | --- |
| 463,051 | France | Dec. 6, 1913 |
| 534,276 | France | Apr. 19, 1921 |